H. C. MARKHAM.
Cheese-Curd Sink.

No. 8,987. Reissued Dec. 2, 1879.

WITNESSES:
E. Laass
C. Garlick

INVENTOR:
Homer C. Markham
per Duell, Laass & Hey
Attorneys

N. PETERS, PHOTO-LITHOGRAPHER, WASHINGTON, D. C.

UNITED STATES PATENT OFFICE.

HOMER C. MARKHAM, OF LYON'S FALLS, NEW YORK.

IMPROVEMENT IN CHEESE-CURD SINKS.

Specification forming part of Letters Patent No. 112,364, dated March 7, 1871; Reissue No. 8,987, dated December 2, 1879; application filed July 9, 1879.

*To all whom it may concern:*

Be it known that I, HOMER C. MARKHAM, of Lyon's Falls, Lewis county, and State of New York, have invented a new and useful Improvement in Cheese-Curd Sinks; and I do hereby declare that the following is a clear, exact, and full description of said improvement and its operation, reference being had to the accompanying drawings, making part of this specification, in which—

Figure 1:
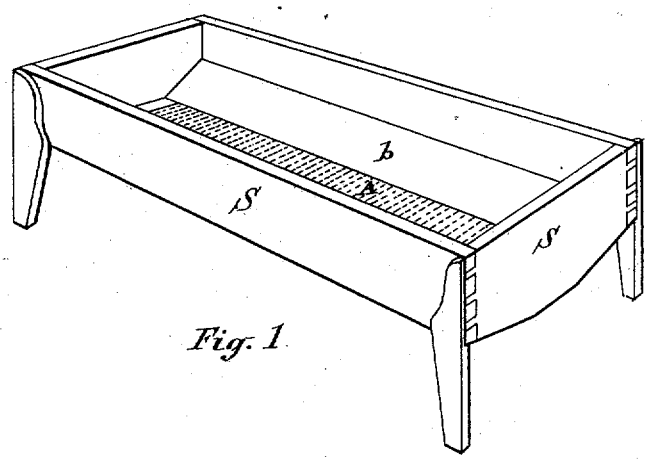
Figure 2:
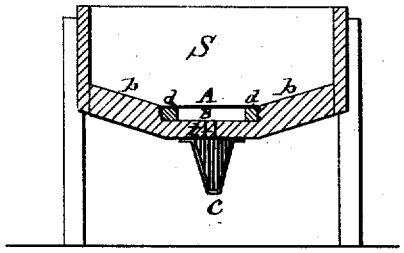

The upper drawing, Figure 1, is a perspective, showing an exterior and interior view of the improved sink, while the lower sketch, Fig. 2, is a sectional view of the sink crosswise, like letters referring to similar parts.

S S is the sink, constructed with sides and ends, as in ordinary use. The bottom *b*, instead of being level, as commonly used, is beveled from the sides toward the center for about one-third of the width on each side.

The portion forming the longitudinal central third is sunken from three-fourths to one inch in depth, thus forming a shallow pit, B, nearly the entire length of the sink, with the exception of some three or four inches at each end. In the bottom of this pit is an opening, *t*, near one end, through which liquids from the sink can run off into the funnel C.

*d d* is a light frame, in thickness nearly equal to the depth of the sunken portion, which is made to fit into the pit B in the bottom of the sink, and over the top of this frame is permanently fastened the metallic strainer A, being turned down at the sides and ends of the frame *d d*. This strainer may be of wire-cloth, but preferably of perforated sheet metal, as being more durable and more readily kept clean. This frame, to which the strainer is attached, may be easily removed for the purpose of cleaning itself and the pit B. In long sinks the strainer-frame may be made in two or more sections for convenience of handling.

In use its operation is as follows: The milk in the cheese-vats having been coagulated, and the curd properly manipulated, cooked, &c., the mass is dipped up into the sink S S, in which the whey is at once allowed to drain off through the perforations in the strainer A into the pit B, from which it is conducted through the aperture *t* into the funnel C. From this it is conveyed by a suitable spout to the whey-vats. During the process of drainage the curd is thoroughly worked over, cooled, salted, and made ready for the press.

In the common sink, as heretofore used, there was a large wooden rack covering the entire bottom of the sink, and over this and extending up over and hanging down around the outside was thrown a large piece of hemp, linen, or cotton strainer-cloth, and onto this cloth, supported by the rack, the curd was thrown and worked over, salted, &c.

It will be seen that in my improvement the large and cumbrous rack so difficult to keep clean and sweet is done away with, while the expense of cloth-strainers, which are constantly being subject to severe wear and tear, is unnecessary, besides which the facility with which the curd can be manipulated in the smooth bottom is far pleasanter to the hands than the old method.

Having thus described my invention, what I claim is—

1. A cheese-curd sink constructed with an inclined or beveled bottom, *b*, longitudinal channel B, and strainer A, substantially as described.

2. A cheese-curd sink having its bottom beveled toward the center, and provided with the longitudinal channel B and the perforated metallic or wire-gauze strainer A, substantially as described, for the purpose set forth.

3. In combination with the inclined bottom *b* and channel B, the frame *d* and perforated metallic strainer A, applied to said frame, substantially as described and shown.

4. A cheese-curd sink having its bottom beveled toward the center, and provided with the longitudinal channel B, the perforated metallic or wire-gauze strainer A, the aperture *t*, and funnel C, all constructed and arranged as described, and for the purpose set forth.

HOMER C. MARKHAM.

Witnesses:

CHAS. GARLICK,

A. D. FOOT.